US012269538B2

(12) United States Patent
Roche et al.

(10) Patent No.: US 12,269,538 B2
(45) Date of Patent: Apr. 8, 2025

(54) LOW FLOOR ELECTRIC VEHICLE

(71) Applicant: Optimal Electric Vehicles Corporation, Plymouth, MI (US)

(72) Inventors: Christopher Roche, Ann Arbor, MI (US); Jingyu Liu, Ann Arbor, MI (US); Mark Bono, Northville, MI (US); Mark Preston, Maybee, MI (US); Song Young, Ann Arbor, MI (US); Viktor Kostrominov, Schererville, IN (US); Dan Daniels, Elkhart, IN (US); Eric Elliott, Canton, MI (US); James Scott, Imlay City, MI (US)

(73) Assignee: Optimal Electric Vehicles Corporation, Plymouth, MI (US)

( * ) Notice: Subject to any disclaimer, the term of this patent is extended or adjusted under 35 U.S.C. 154(b) by 419 days.

(21) Appl. No.: 17/127,905

(22) Filed: Dec. 18, 2020

(65) Prior Publication Data

US 2022/0194489 A1 Jun. 23, 2022

(51) Int. Cl.
*B62D 31/02* (2006.01)
*A61G 3/06* (2006.01)
(Continued)

(52) U.S. Cl.
CPC .......... *B62D 31/025* (2013.01); *A61G 3/061* (2013.01); *B60K 1/00* (2013.01); *B60K 1/04* (2013.01);
(Continued)

(58) Field of Classification Search
CPC ...... B60K 1/00; B60K 1/04; B60K 2001/001; B60K 2001/0438; B62D 31/025; A61G 3/061; B60P 1/431
See application file for complete search history.

(56) References Cited

U.S. PATENT DOCUMENTS 4,330,045 A * 5/1982 Myers ..................... F16D 55/22
475/900
4,809,824 A * 3/1989 Fargier .................. B60T 13/741
188/106 P
(Continued)

FOREIGN PATENT DOCUMENTS

JP 6766899 B2 * 10/2020 ............... B60K 1/04

OTHER PUBLICATIONS

Machine Translation of JP-6766899, Hara et al. (generated Jun. 21, 2024) (Year: 2024).*

*Primary Examiner* — Frank B Vanaman
(74) *Attorney, Agent, or Firm* — Hovey Williams LLP; Kameron D. Kelly (57) ABSTRACT

A low floor electric bus includes a frame extending longitudinally from a front end to a rear end, the frame having two sidepieces and a plurality of crossmembers extending between and coupled to the sidepieces, wherein the frame has a central section positioned at a lower height relative to the front and/or rear sections. The bus further includes a battery pack mounted to the central section of the frame; a powertrain having an electric motor and a driveshaft, wherein the electric motor is mounted to the rear section of the frame behind a rear axle coupled to the frame and the driveshaft extends from the electric motor to the rear axle; and a cradle coupled to the front section of the frame. A mixed-material cabin is also provided. The cabin includes a passenger cabin with a floor, sidewalls, and ceiling having steel, ceramic, and composite components.

18 Claims, 12 Drawing Sheets

(51) Int. Cl.
*B60K 1/00* (2006.01)
*B60K 1/04* (2019.01)
*B60K 17/22* (2006.01)
*B60P 1/43* (2006.01)
*B60R 16/02* (2006.01)
*B62D 21/07* (2006.01)
*B62D 29/00* (2006.01)

(52) U.S. Cl.
CPC .............. *B60K 17/22* (2013.01); *B60P 1/431* (2013.01); *B60R 16/0207* (2013.01); *B62D 21/07* (2013.01); *B62D 29/001* (2013.01); *B60K 2001/001* (2013.01)

(56) References Cited

U.S. PATENT DOCUMENTS

| | | | | |
|---|---|---|---|---|
| 5,348,123 | A * | 9/1994 | Takahashi | B60T 13/745 188/162 |
| 6,116,626 | A * | 9/2000 | Cherry | B62D 7/18 244/50 |
| 6,367,597 | B1 * | 4/2002 | De Vries | F16D 65/18 188/71.9 |
| 7,115,058 | B2 * | 10/2006 | Duncan | B60K 6/48 475/5 |
| 9,937,781 | B1 * | 4/2018 | Bryer | B62D 35/02 |
| 10,744,899 | B2 * | 8/2020 | Schepmann | B60L 58/21 |
| 10,811,869 | B2 * | 10/2020 | Pevear | H02H 7/18 |
| 2011/0088957 | A1 * | 4/2011 | Yankoski | H02K 7/006 180/62 |
| 2011/0259657 | A1 * | 10/2011 | Fuechtner | B60K 7/0007 903/902 |
| 2013/0000997 | A1 * | 1/2013 | Peng | B60L 58/26 180/65.6 |
| 2013/0192914 | A1 * | 8/2013 | Nakamori | B60L 50/64 180/68.5 |
| 2015/0249240 | A1 * | 9/2015 | Hihara | H01M 8/2475 180/68.5 |
| 2016/0167522 | A1 * | 6/2016 | Chen | B60H 1/00392 180/53.8 |
| 2019/0275875 | A1 * | 9/2019 | Fukui | B62D 25/20 |
| 2019/0291785 | A1 * | 9/2019 | Nagano | B62D 21/155 |
| 2020/0262500 | A1 * | 8/2020 | Hara | B60P 1/431 |

* cited by examiner

LOW FLOOR ELECTRIC VEHICLE

BACKGROUND

The present disclosure relates to an electric vehicle; and more particularly, to an electric bus having a low floor platform for accommodating a disability ramp.

Figure 1A:
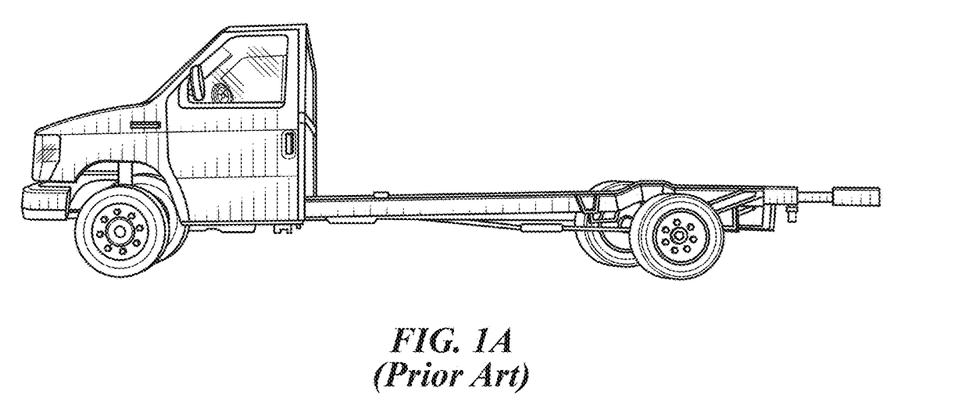
FIG. 1A shows a side view of a cutaway chassis with cab for an internal combustion engine, as known in the prior art.
Figure 1B:
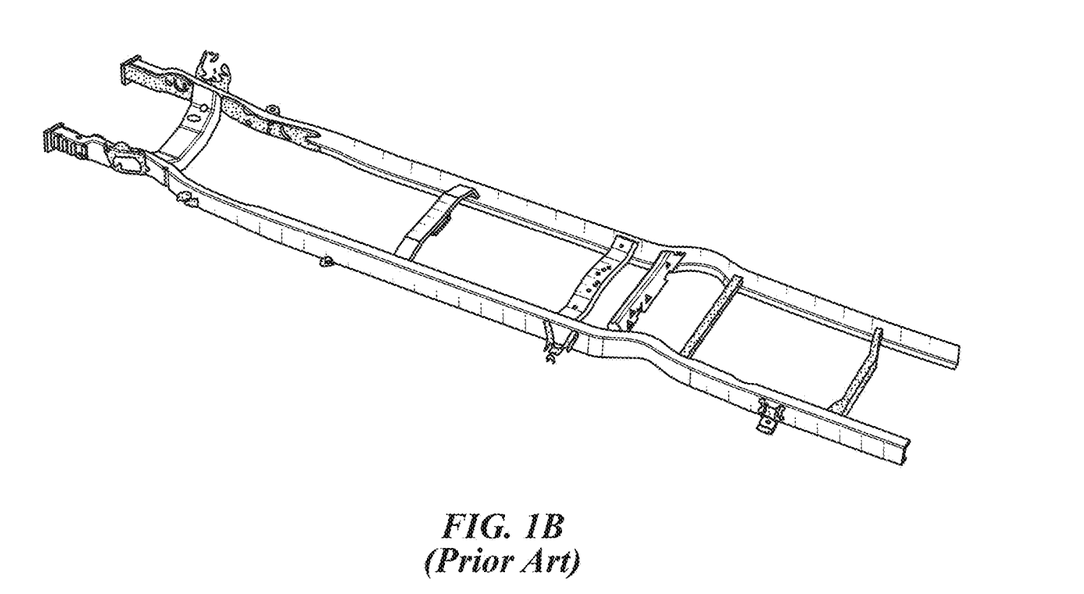
FIG. 1B shows a perspective view of the chassis of FIG. 1A.

Existing electric commuter buses are built out from an unmodified cutaway chassis frame available from a variety of original equipment manufacturers (OEM). As shown in FIGS. 1A and 1B, a commercially available cutaway chassis has a frame that is substantially planar along its longitudinal axis from one end to the opposite end. Existing electric buses generally employ multiple battery packs mounted at frame height and the electric motor is positioned forward of the rear axle. The unmodified cutaway chassis causes the buses to have a high floor in the passenger cabin. Because of the high floor of the bus frame and the relevant regulations for passengers with disabilities, such buses are not capable of extending a disability ramp toward a sidewalk to enable disabled passengers to board the bus. Instead, some buses employ a disability lift fitted for wheelchair-assisted paratransit passengers that raises the passenger from the ground to the high floor of the bus, while other buses have no provisions for disabled passengers. These lifts add substantial weight to the bus, occupy a substantial amount of space in the passenger cabin, and disrupt the weight distribution of the bus. Furthermore, existing bus conversions potentially exhibit, among other things, an unsafe front impact performance. For at least these reasons, there remains a need for an electric bus conversion having a low floor that is accessible by disability ramp, adheres to the regulations for passengers with disabilities, and provides a safety profile comparable to a bus with an internal combustion engine built from the same original cutaway chassis.

SUMMARY

In various embodiments, a low floor electric bus conversion of a cutaway chassis, comprising a frame, a battery pack, a powertrain, and a cradle. In some embodiments, the frame extends longitudinally from a front end to a rear end of the bus, the frame comprises two sidepieces and a plurality of crossmembers extending between and coupled to the sidepieces, and the frame comprises a front section, a central section, and a rear section, wherein the central section is positioned at a lower height relative to the front section. In some embodiments, the battery pack is mounted to a central portion of the frame, the powertrain comprises an electric motor and a driveshaft, the electric motor is mounted to the rear section of the frame behind a rear axle coupled to the frame, the driveshaft extends from the electric motor to the rear axle, and the cradle is coupled to the front section of the frame.

In some embodiments, the low floor electric bus further comprises a driver cabin and a passenger cabin, wherein the driver cabin is positioned above the front section of the frame, and the passenger cabin is positioned above the central and rear sections of the bus.

In some embodiments, the low floor electric bus further comprises a disability ramp securably coupled to the frame, wherein the disability ramp extendable from a doorway housing to a ground surface when the bus is parked. In some embodiments, the frame comprises an impression configured to receive a cross section of the disability ramp.

In some embodiments, the cradle is configured such that the bus will match one or more performance metrics of a bus comprising an unmodified cutaway chassis and an internal combustion engine, the one or more metrics comprising front impact performance, sensing for air bag deployment, and deceleration pulse. In some embodiments, the cradle is configured to maintain a baseline performance with respect to the front impact performance in a crash event at a speed of up to 30 mph.

In some embodiments, the electric motor is a direct drive traction motor having no gearbox, the traction motor is positioned behind the rear axle, and the rear axle is oriented to allow for a rear drive configuration. In some embodiments, the rear axle comprises a differential oriented to couple the driveshaft from a rear position.

In some embodiments, the powertrain further comprises an inverter and an electronic park brake. In some embodiments, the electronic park brake comprises a rotor and a brake caliper, each coupled to the electric motor, wherein the rotor is coupled to a motor output flange, and the electronic park brake further comprises a caliper mounting bracket, an electronic control unit, and a wiring harness.

In some embodiments, the battery pack functions as a load-bearing crossmember. In some embodiments, no further crossmembers are coupled to the two side pieces in the central section.

In some embodiments, the frame further comprises a skid plate coupled to the two sidepieces, the skid plate positioned between the front end and the battery pack to protect the battery pack from road debris.

In various embodiments, a mixed material bus cabin is provided. In some embodiments, the mixed material bus cabin comprises a floor assembly, a sidewall assembly, and a roof assembly, wherein the floor assembly comprises one or more longitudinal steel tubes, one or more transverse steel tubes, and one or more floor panels constructed out of a steel sheet; the floor assembly further comprising a composite panel on top of the longitudinal tubes, transverse tubes, and floor panels and a flooring material on top of the composite panel; wherein the sidewall assembly comprises one or more of the sidewall panels, each panel comprising a pair of outer vertical steel tubes covered with a ceramic coating, an interior coating, and an exterior coating; and wherein the roof assembly comprises an interior surface and an exterior surface, one or more steel tubes extending between opposing sidewalls, combined with a separate composite panel(s) and interior trim pieces.

The foregoing general summary is intended to provide an overview or framework for understanding the nature and character of the embodiments disclosed herein. This summary is not intended to identify essential inventive concepts of the claimed subject matter or limit the scope of the claimed subject matter. Additional features and advantages of the embodiments disclosed herein will be set forth in the detailed description that follows, and in part will be clear to those skilled in the art from that description or recognized by practicing the embodiments described herein, including the detailed description that follows, the claims, and the appended drawings.

BRIEF DESCRIPTION OF THE DRAWINGS

A complete understanding of the present embodiments and the advantages and features thereof will be more readily understood by reference to the following detailed description, appended claims, and accompanying drawings, wherein:

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the accompanying drawings. Whenever possible, the same reference numerals will be used throughout the drawings to refer to the same or like parts.

Before describing the exemplary embodiments, it is noted the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

In various embodiments, as shown in FIGS. 2-8, a low floor electric bus 100 comprising a chassis frame 110 and a body 200 is provided. Any suitable chassis frame and body construction method can be used, including a cutaway chassis, a stripped chassis, or a chassis cab, each of which can be prepared using a body-on-frame construction; or, a unibody construction in which the vehicle body is unified with and structurally integral to the chassis. For example, in some embodiments, the chassis is a cutaway chassis, such as a Ford E450 frame, or a chassis frame provided by another manufacturer, including Dodge, General Motors, Chevy, and International.

Figure 2:
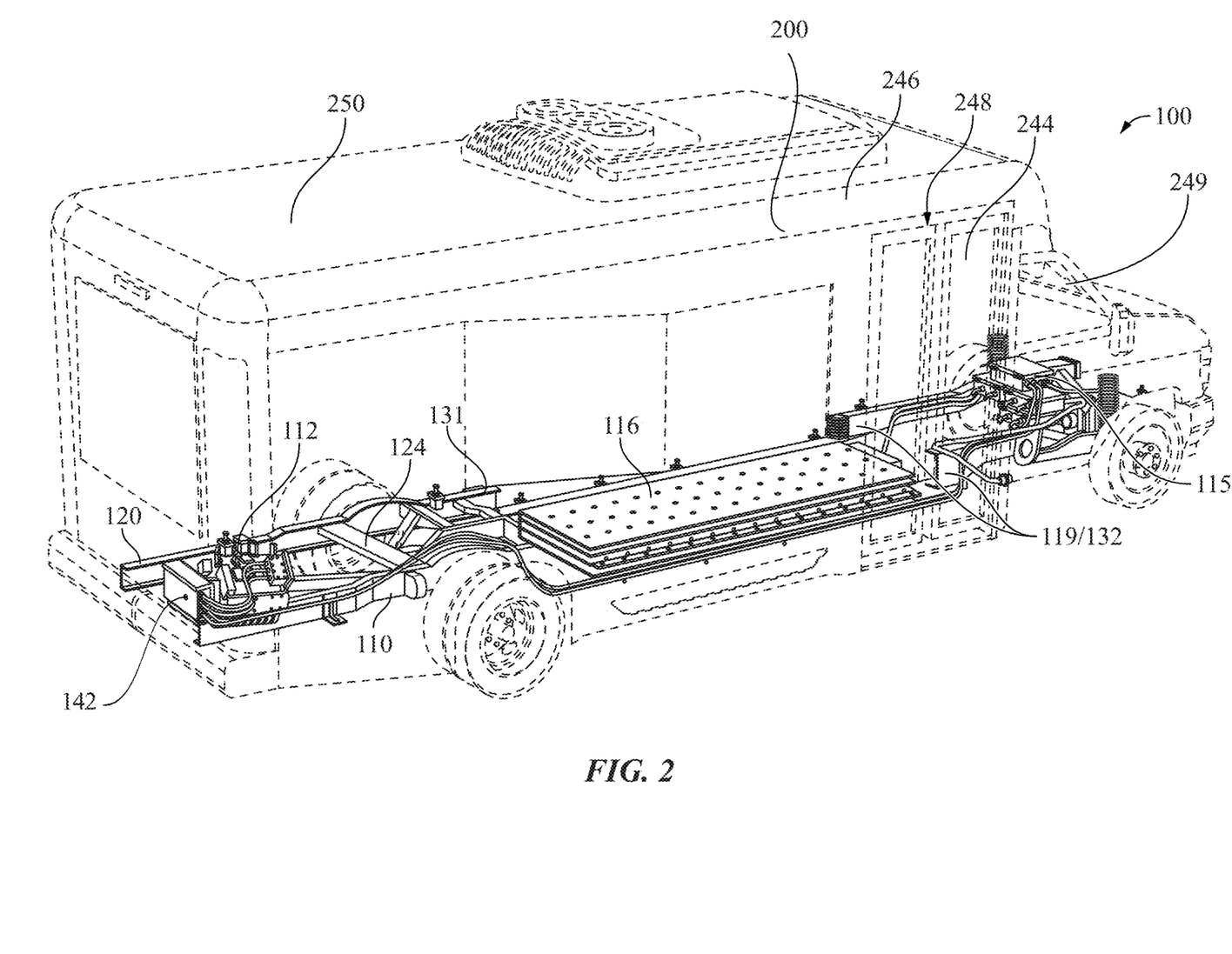
FIG. 2 shows an environmental perspective view of an electric vehicle system built on a cutaway chassis, according to embodiments described herein.
Figure 3A:
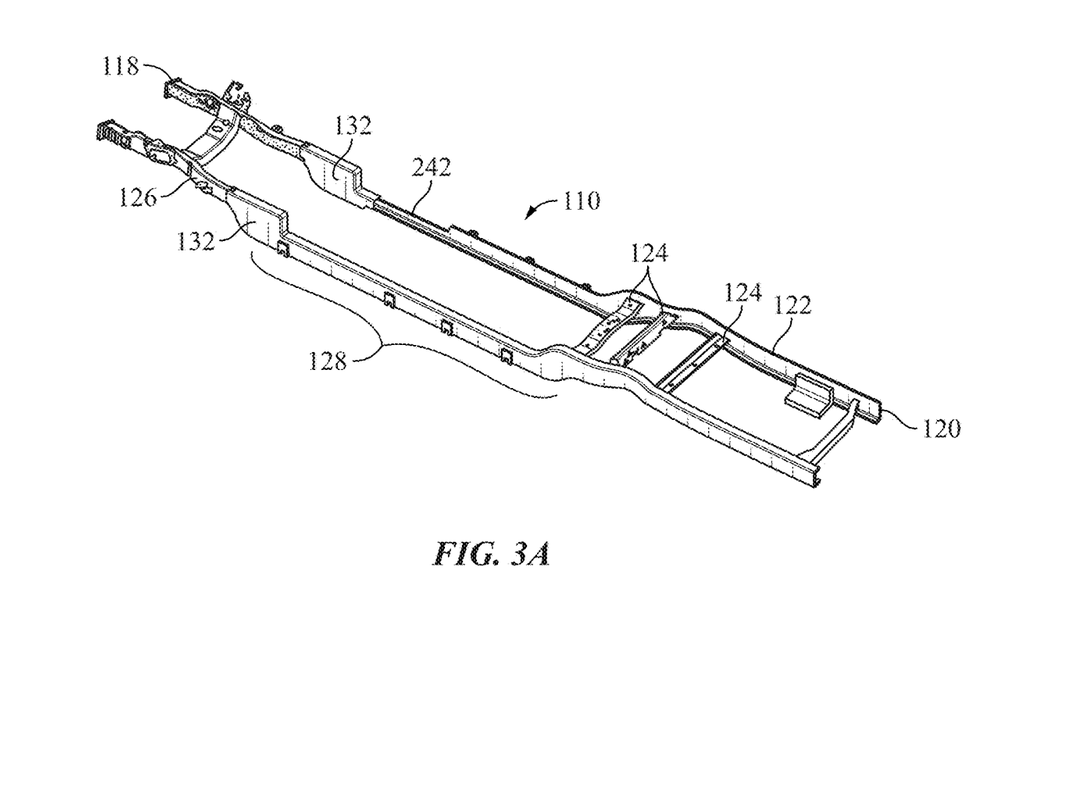
FIG. 3A shows a perspective view of a chassis frame, according to embodiments described herein.
Figure 3B:
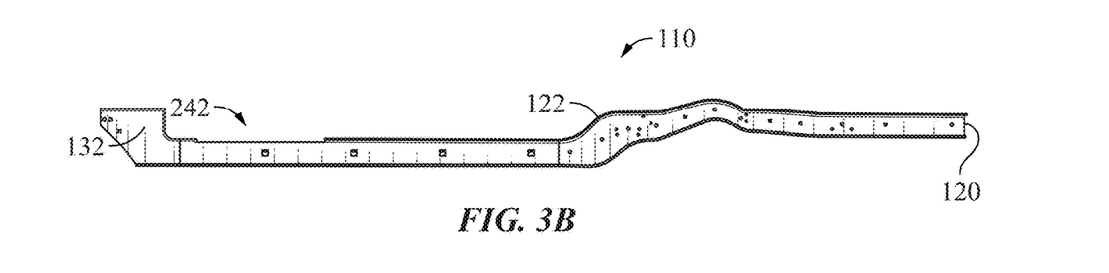
FIG. 3B shows a partial side view of a chassis frame according to FIG. 3A.
Figure 3C:
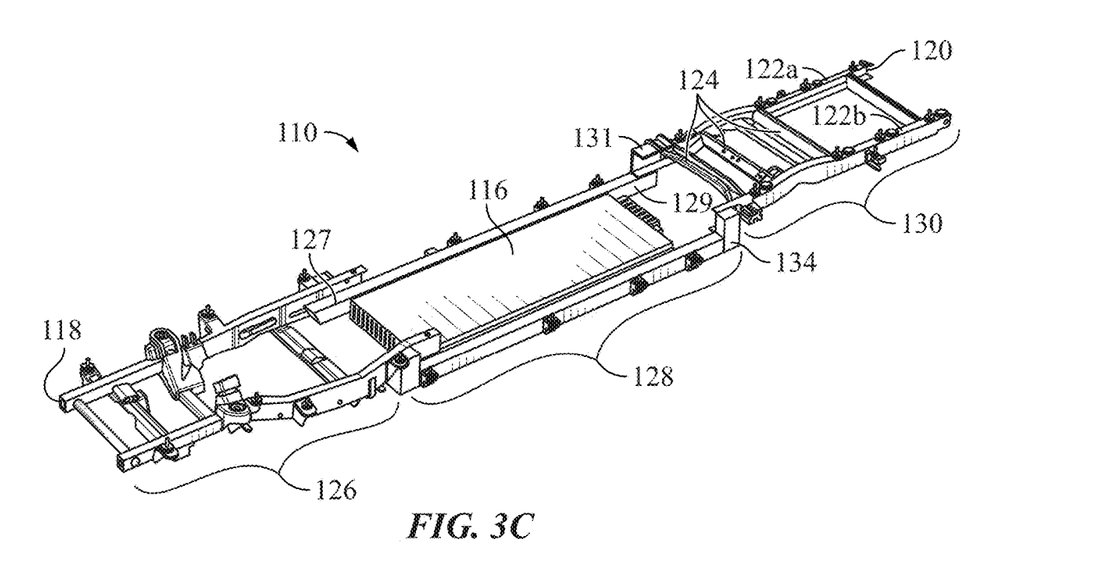
FIG. 3C shows a perspective view of a chassis frame, according to embodiments described herein.
Figure 3D:
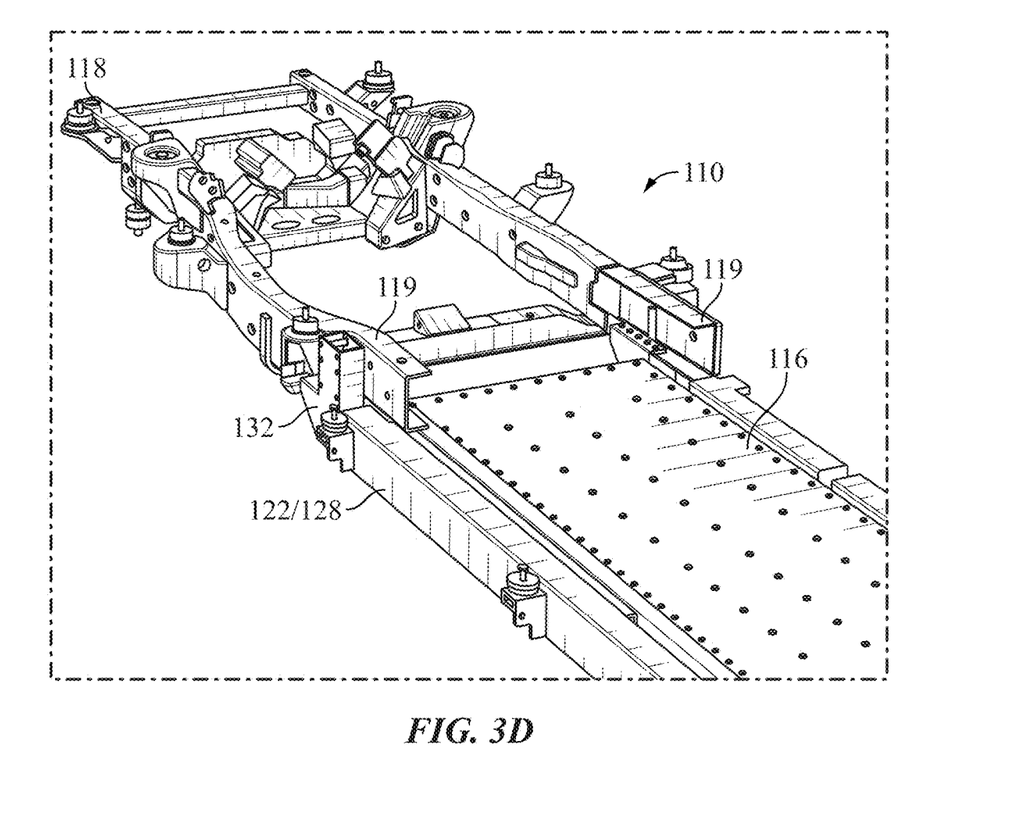
FIG. 3D shows a partial perspective view of the chassis frame according to embodiments described herein.

In some embodiments, as shown in FIGS. 2-3D, the frame 110 comprises a lowered central section 128 that is configured to accommodate a battery pack 116, accommodate a disability ramp 240, and accommodate a plurality of wheelchair-assisted passengers within the passenger cabin. In some embodiments, the bus 100 comprises a single battery pack 116. In some embodiments, the bus 100 further comprises an electric motor 112, a high voltage power electronics cradle 114 supporting one or more power electronics 115, and a high voltage battery pack 116.

In some embodiments, as shown in FIG. 2, the bus 100 comprises a body 200 coupled to the frame 110. In some embodiments, for example, the body 200 and the frame 110 are coupled using a body-on-frame construction method. The body 200 comprises a driver cabin 249, a passenger cabin 246, and a door assembly 248 having a door 244. In such embodiments, passengers can board or deboard the bus 100 through a doorway created when the door 244 is in an open position.

In some embodiments, as shown in FIGS. 2-6A, the frame 110 extends longitudinally from a front end 118 to a rear end 120 of the bus 100. The frame 110 comprises two sidepieces 122 (122a, 122b), and a plurality of crossmembers 124 extending between and coupled to the sidepieces 122. In some embodiments, one or more sections of the frame 110 do not include a crossmember 124. In some embodiments, one or more sections of the frame 110 are not coplanar with one or more other sections of the frame 110.

In some embodiments, as shown in FIGS. 3A-3D, the frame 110 comprises a front section 126, a central section 128, and a rear section 130. In some embodiments, the front, central, and rear sections of each sidepiece 122 are constructed out of a single component. In some embodiments, the front, central, and rear sections are constructed out of two or more independent components that can be combined to provide the contiguous sidepieces 122. In some embodiments, each of the front, central, and rear sections is an independent component that can be coupled together with the other sections to obtain a contiguous sidepiece 122. In some embodiments, the front section 126 is a first sidepiece component and the central and rear sections together are a second sidepiece component, and the two components are combinable to form a contiguous sidepiece 122.

In various embodiments, each sidepiece 122 comprises two or more components that are coupled together with a connecting frame joint. In some embodiments, as shown in FIGS. 2-3C, the front section 126 extends from the front end 118 of the frame 110 to a first pair of frame joints 132. In such embodiments, the frame joints 132 are configured to receive further components of the sidepiece 122. For example, in some embodiments, the front section 126 comprises a front end 118 and a second end 119 that is coupled to a first end 127 of the central section 128 with a first pair of frame joints 132. In such embodiments, the central section 128 is positioned at a lower height than the front section 126, and the height difference between the front and central sections is defined by the size and design of the frame joints 132.

In some embodiments, as shown in FIGS. 3A and 3B, the frame 110 comprises a front section 126, a pair of joints 132, and a second section 128 positioned at a lower height relative to the first section 126. In such embodiments, a rear section 130 follows the central section 128 without any additional frame joints.

In some embodiments, as shown in FIGS. 3C and 3D, the frame 110 comprises a front section 126, a first pair of joints 132, a central section 128 connected to the front section 126 via the joints 132 and positioned at a lower height than the first section 126, a second pair of joints 134, and a rear section 130 connected to the central section 128 and positioned at a higher height than the central section 128. In such embodiments, the second ends 119 of the first section 126 are coupled to the first ends 127 of the central section using a first pair of frame joints 132, the second ends 129 of the central section 128 are coupled to the first ends 131 of the rear section 130 using a second pair of frame joints 134, and the second ends of the rear section 130 are also the rear end 120 of the frame 110.

Figure 4A:
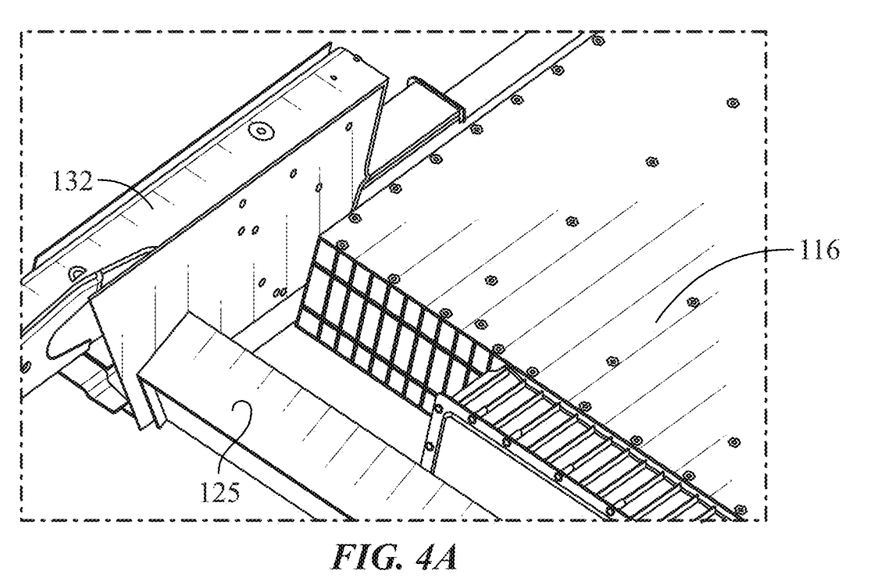
FIG. 4A shows a partial view of a chassis joint and a skid plate mounted to a crossmember of the chassis, according to FIG. 3.
Figure 4B:
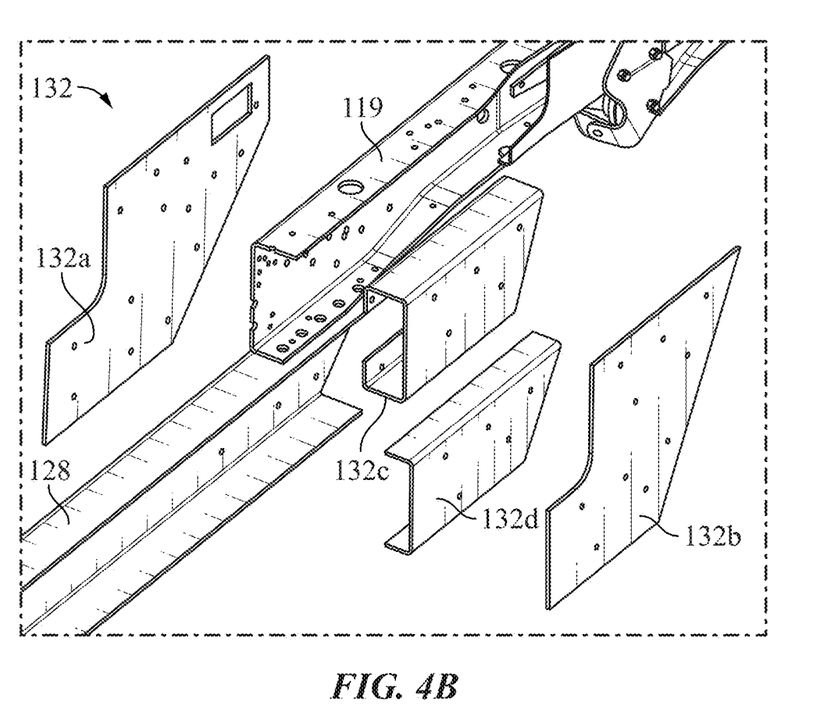
FIG. 4B shows an exploded view of the chassis joint according to FIG. 4A.

As shown in FIG. 4B, in some embodiments the frame joint 132 utilized to couple together the front section 126 and the central section 128 comprises a plurality of subcomponents. In some embodiments, for example, the front section 126 and the central section 128 are comprised of C-channel bars, and the subcomponents 132c and 132d are comprised of complementary C-channel bars. In some embodiments, the frame joint 132 further comprises outer plates 132a and 132b, which enclose and stabilize the subcomponents, and cover the sides of the frame joint 132.

In various embodiments, the bus 100 comprises a battery pack 116. As shown in FIGS. 2, 3C, 3D, and 4A, in some embodiments, the bus 100 comprises only one battery pack 116, which is mounted in the central section 128 of the frame 110. In such embodiments, the battery pack 116 extends between and is coupled to the sidepieces 122a and 122b. In such embodiments, because the battery pack 116 is sufficiently coupled to the sidepieces, it also functions as a load bearing crossmember for the frame 110.

As shown in FIG. 4A, in some embodiments, the frame 110 comprises a skid plate 125 crossmember that is positioned in front of the battery pack 116. In some embodiments, one of the crossmembers of the frame 110 is modified into a skid plate 125 and is positioned in front of the battery pack 116. Because the skid plate 125 is positioned in front of the battery pack 116, any debris on a roadway that jumps toward the front end of the battery pack 116 will be blocked and the battery pack will avoid damage in that circumstance. In some embodiments, the skid plate 125 is coupled to the frame joints 132 coupling the front and central sections 126, 128.

Figure 6A:
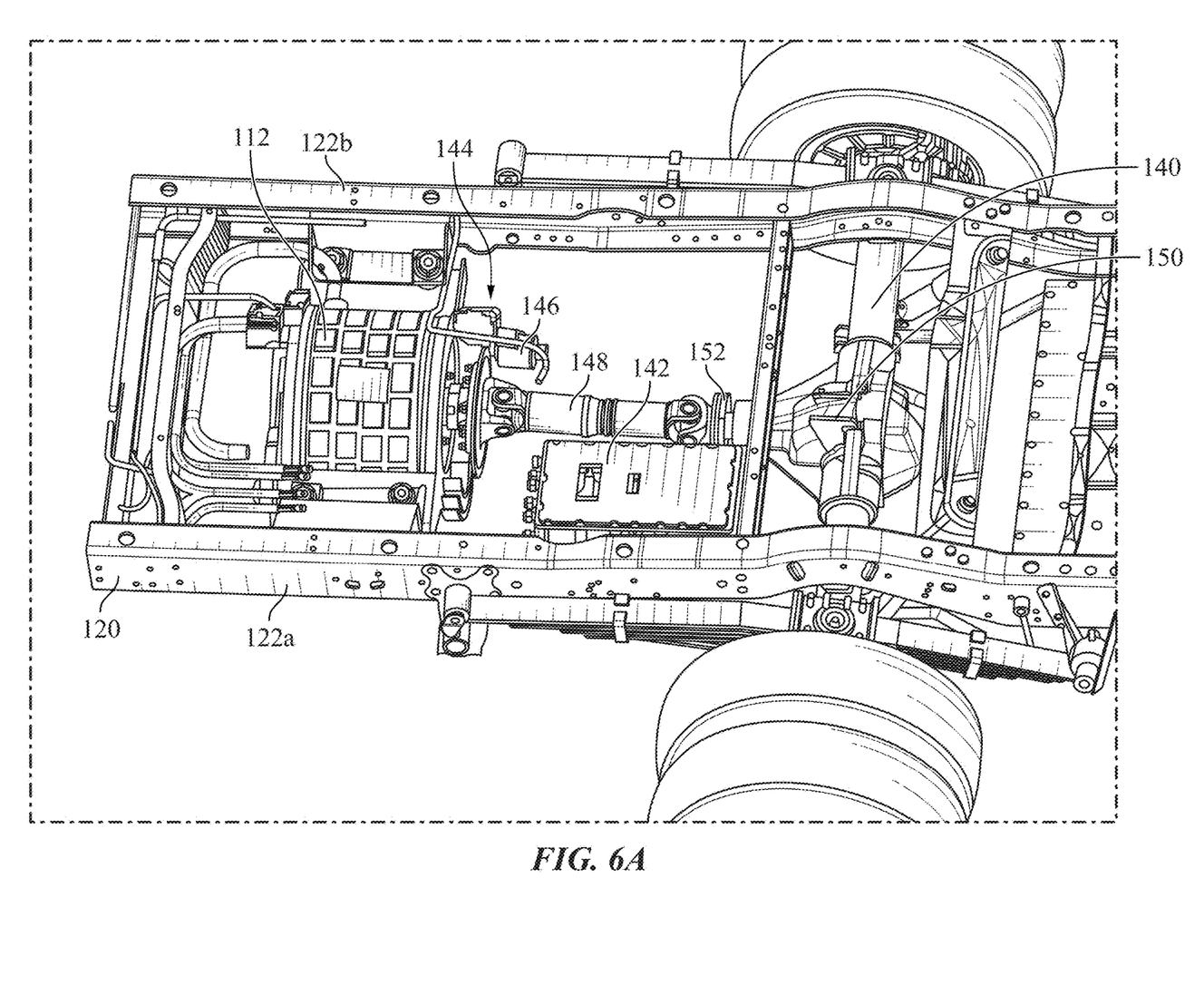
FIG. 6A is a diagram showing the configuration of the rear power train, according to embodiments described herein.
Figure 6B:
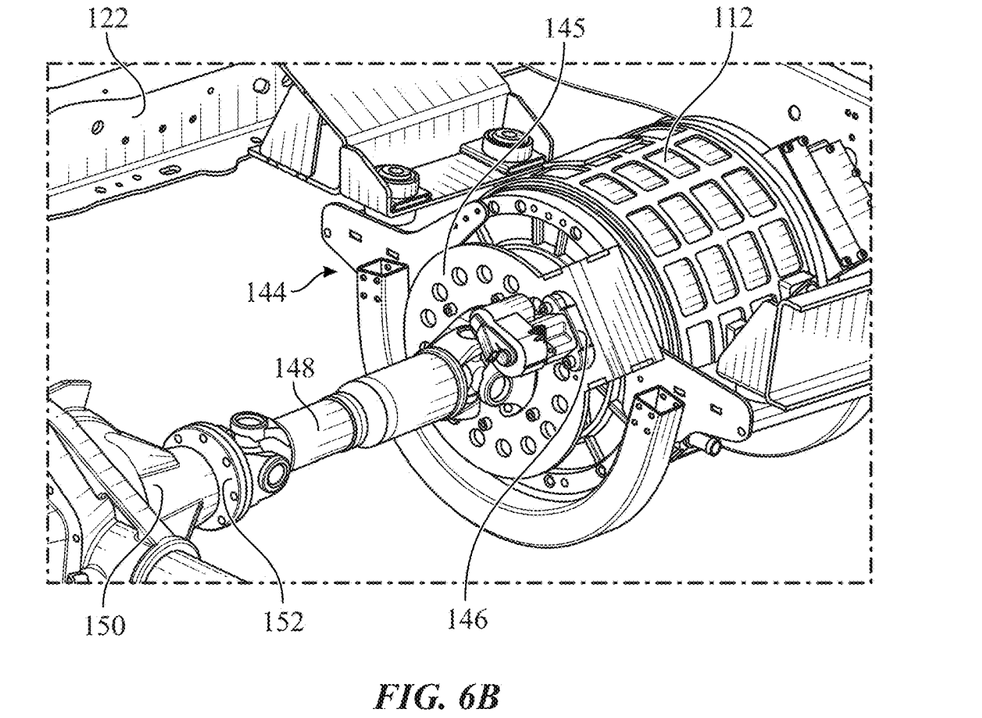
FIG. 6B shows a perspective view of the electronic park brake in FIG. 6A.

In some embodiments, as shown in FIGS. 6A and 6B, the bus 100 comprises an electric motor 112, which is coupled to the sidepieces 122a, 122b of the frame 110 in the rear section 130. In such embodiments, the electric motor 112 is positioned between the rear axle 140 and the rear end 120. In some embodiments, the electric motor 112 is coupled to a differential 150 associated with the rear axle 140. In such embodiments, a first driveshaft component 148 protruding from the engine 112 is coupled to a second driveshaft component 152, which is connected to a differential 150 on the rear axle. As depicted in FIGS. 6A and 6B, the first driveshaft component 148 is coupled to the electric motor 112 by a first universal joint and the second driveshaft component 152 is coupled to the first driveshaft component 148 by a second universal joint. In such embodiments, the bus 100 is a rear-wheel drive vehicle, similar to a commercially available cutaway chassis, but the engine and drivetrain are positioned behind the rear axle 140, whereas such components are positioned in front of the rear axle in existing buses and commercially available cutaway chassis.

In some embodiments, the rear axle 140 is configured to provide an extended wheel base relative to a commercially available cutaway chassis. In such embodiments, for example, a portion of the frame between the suspension mounting locations is extended. In some embodiments, the frame is lengthened to increase the length relative to an original OEM frame whilst maintaining comparable bending and torsional stiffness.

In some embodiments, as shown in FIGS. 6A and 6B, the electric motor 112 comprises an electronic park brake assembly 144. In some embodiments, the electronic park brake assembly 144 comprises a rotor 145 and a caliper 146. In some embodiments, the rotor 145 is positioned in front of the motor 112 and between the motor 112 and the driveshaft 148.

In some embodiments, as shown in FIG. 6A, the bus 100 comprises an inverter 142. In such embodiments, the inverter 142 is coupled to a sidepiece 122 of the frame 110. In some embodiments, as shown in FIG. 2, the inverter 142 is mounted behind the engine electric motor 112.

Figure 5:
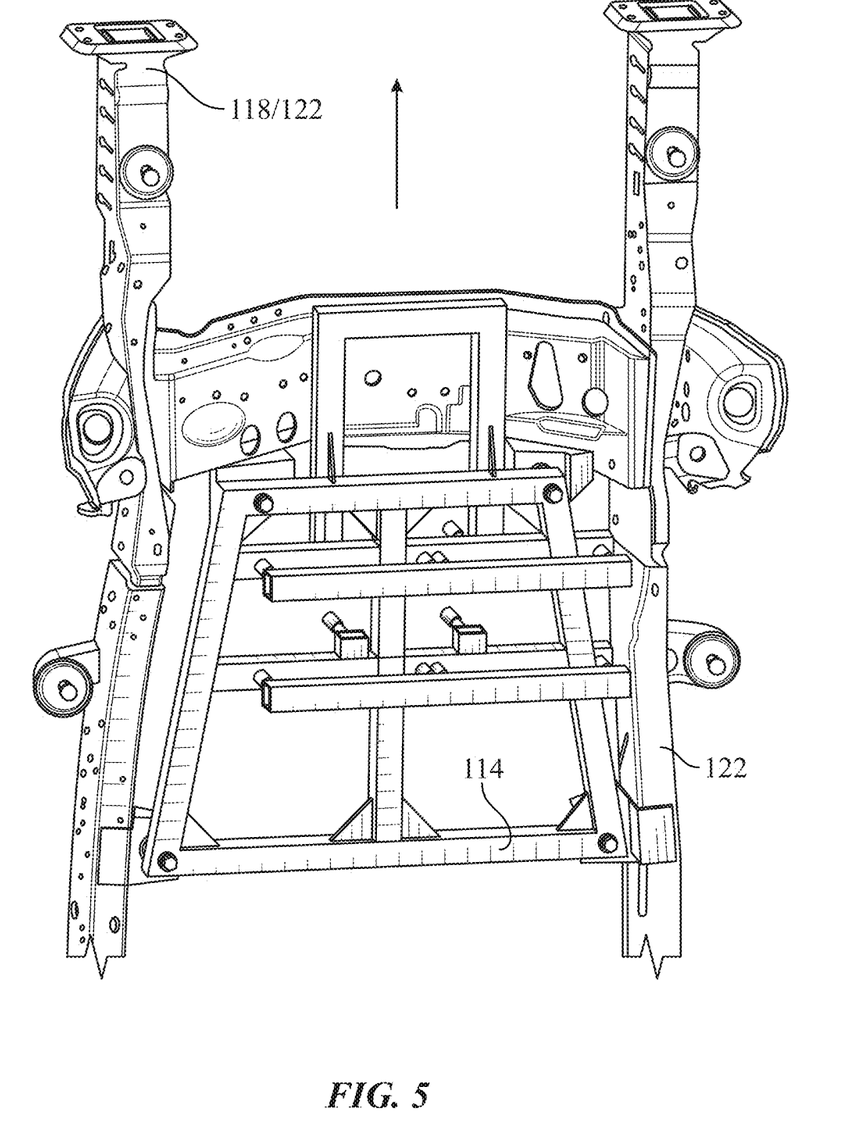
FIG. 5 shows a top view of a cradle located in the engine compartment of the chassis frame of FIG. 2.

As shown in FIG. 5, in some embodiments, the bus 100 comprises a high voltage power electronics (HVPE) cradle 114. In such embodiments, the HVPE cradle 114 supports one or more electrical components 115. For example, as shown in FIG. 2, one or more electrical components 115 are positioned on the HVPE cradle 114 in the front section of the bus 100. In some embodiments, for example, the electronic components and the HVPE cradle 114 are located in the engine housing of a commercially available cutaway chassis. In some embodiments, the one or more electronic components 115 include an on-board charger (OBC); a DC-DC converter; a power distribution unit (PDU); braking and steering components including a pump, motor, and motor controller; a DC-FC (fast charge) module, a positive temperature coefficient (PTC) heater, low voltage (LV) components, including a LV PDU and fuses; an air conditioning (AC) compressor for HVAC, and one or more vehicle control units (VCUs).

Figure 7:
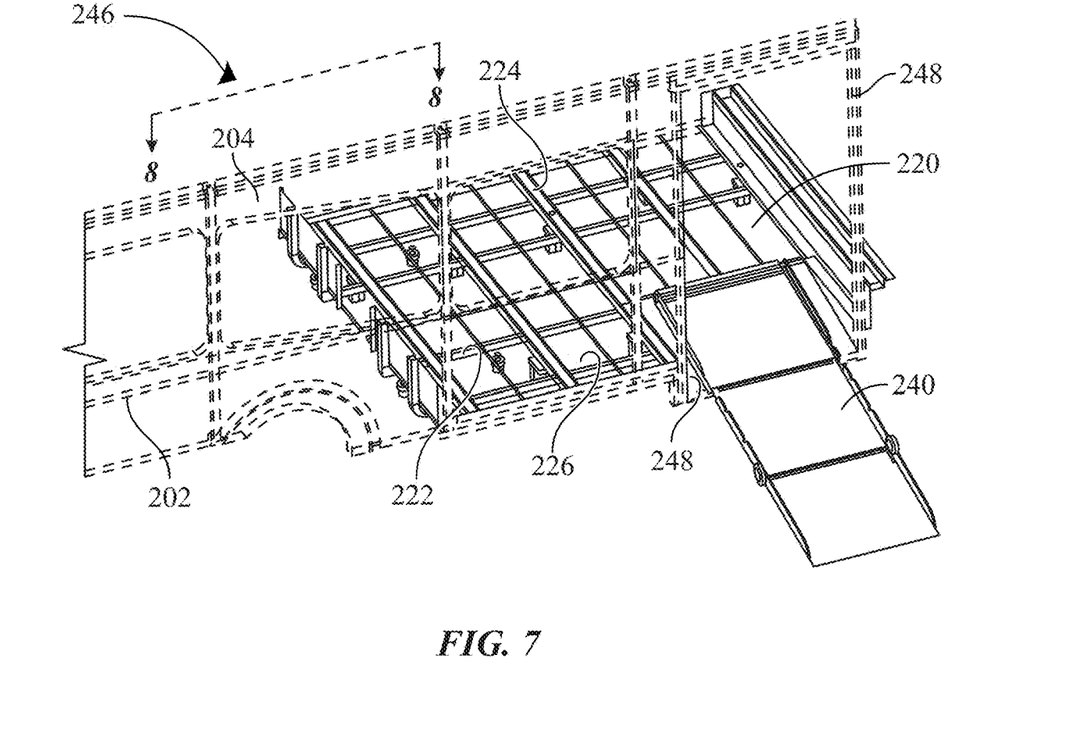
FIG. 7 shows a partial perspective view of a ramp accessing the floor of the electric vehicle, according to embodiments described herein.

In some embodiments, as shown in FIGS. 2 and 7, the bus 100 comprises a body 200 comprising one or more sidewalls 202, a floor assembly 220, and a roof assembly 250. In such embodiments, the sidewall 202 comprises one or more sidewall panels 204. In some embodiments, the components of the body 200 and the frame 110 are coupled using a body-on-frame construction method.

Figure 8:
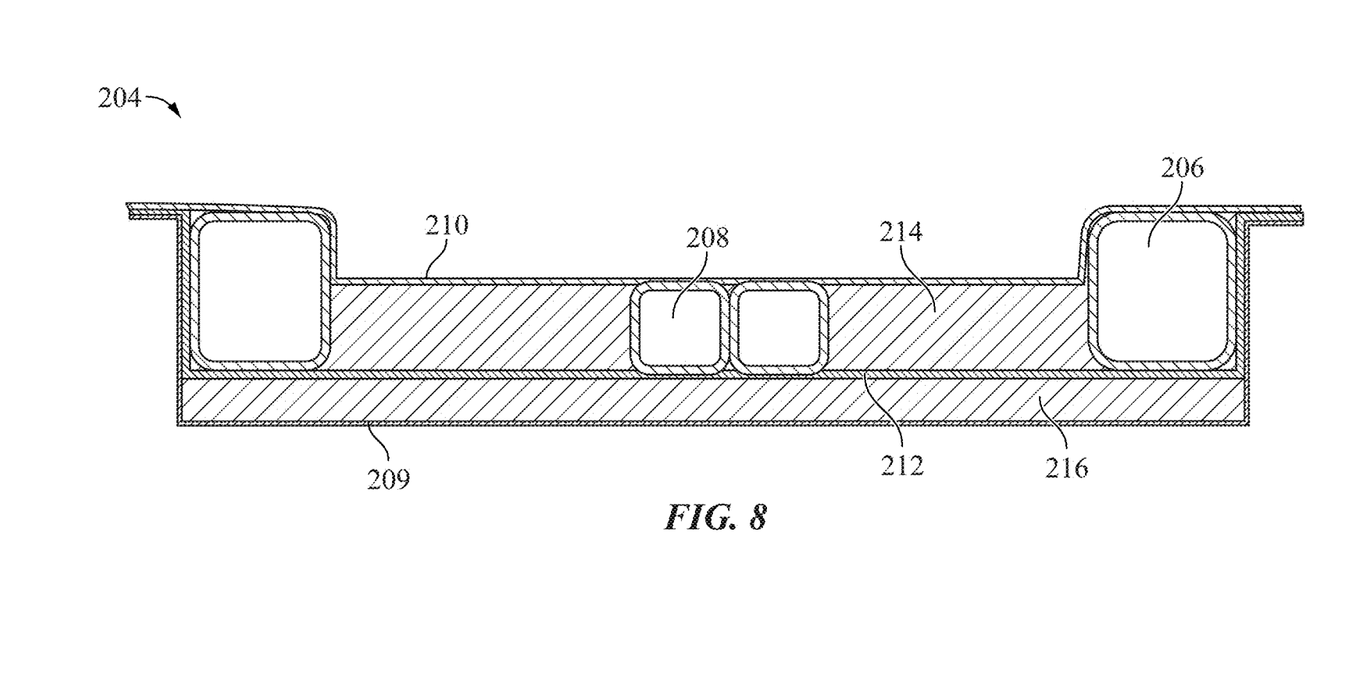
FIG. 8 is a cross-sectional view of a body panel construction, according to embodiments described herein.

As shown in FIGS. 7 and 8, in some embodiments, the sidewall panels 204 are constructed of mixed materials. In some embodiments, each of the one or more of the sidewall panels 204 comprises a pair of outer vertical tubes 206. Optionally, in some embodiments, one or more inner vertical tubes 208 are included in a sidewall panel 204 as needed. The vertical tubes 206, 208 can be any suitable high-strength material. In some embodiments, for example, the vertical tubes 206, 208 are constructed from steel or similar metal alloys. In some embodiments, the one or more vertical tubes 206, 208 are covered with a protective coating. For example, in some embodiments, the vertical tubes 206, 208 have a ceramic coating, such as a water-based acrylic insulation coating. Such coatings provide a thermal barrier for the tubes, which allows for materials to be used for the wall panels, including materials embedded in a composite manufacturing process such as resin transfer molding (RTM lite). In some embodiments, the vertical tubes 206, 208 are steel that has been coated prior to installation in order to improve the appearance of the final panel (i.e., prevent read-through of the tubes to the glass fiber or outer surfaces, thus affecting surface appearance from the inside or outside of the bus).

In some embodiments, one or more of the sidewall panels 204 comprises an exterior side 209 viewable to a person looking at the bus 100 from street level, and an interior side 210 viewable to a passenger inside the bus. In some embodiments, the surface of the interior side 210 comprises a coating, such as a resin (e.g., spray or rolled on fiber chop with resin). In some embodiments, the surface of the exterior side 209 comprises a coating, such as a resin (e.g., gel-coat and/or a high gloss primer). In some embodiments, one or more of the sidewall panels 204 further comprises an inner support element 212.

In some embodiments, the sidewall panels 204 are constructed of mixed materials. For example, the inner support element 212 can be any suitable material, including, for example a resin capable of exhibiting the desired properties. In some embodiments, the desired properties include low viscosity, low exotherm, low shrinkage, excellent fiberglass wet-out, good resin cure, and high vinyl ester content. One or more of such desired properties can offer benefits, including rapid filling of sidewalls, improved surface quality, high laminate physical properties, improved resistance to post-cure, and excellent resistance to osmotic blistering. In some embodiments, for example, the resin is a non-thixotropic, modified vinyl ester resin designed for a vacuum infusion process. In some embodiments, the one or more of the sidewall panels 202 comprises an insulation 216 between the exterior side 209 and the inner support element 212, and an insulation 214 between the inner support element 212 and the interior side 210. The material for the insulation 214 can be any suitable material, including for example, a PET foam.

In some embodiments, the roof assembly 250 is constructed of mixed materials. The roof assembly comprises an interior surface and an exterior surface. In some embodiments, the roof assembly 250 comprise one or more roof panels. In such embodiments, the materials described for the sidewall panels 204 are also applicable to the roof assembly 250 and/or roof panels. For example, in some embodiments, each roof panel comprises one or more steel tube(s) extending laterally between opposing sidewalls 202, combined with a separate composite panel(s) and interior trim pieces.

In some embodiments, the passenger cabin 246 comprises a floor assembly 220 constructed of mixed materials. In such embodiments, the floor assembly 220 is constructed from one or more longitudinal tubes 222, one or more transverse tubes 224, and one or more floor panels 226. The longitudinal tubes 222, transverse tubes 224, and floor panels 226 can be comprised of any suitable material. For example, in some embodiments, the longitudinal and transverse tubes are constructed out of steel and the floor panel is constructed out of a steel sheet. The floor assembly 220 can include further components. In some embodiments, the floor assembly 220 comprises a composite panel on top of the longitudinal tubes, transverse tubes, and floor panels and a flooring material on top of the composite panel.

There are several advantages to the mixed material body 200, including the mixed material passenger cabin 246 comprising one or more sidewalls 202 and a floor assembly 220. In such embodiments, the mixed material composition of the components in body 200, such as steel and composite structural elements, provide the required strength, stiffness, and thermal insulation required for the duties on a bus. Further, the cabin body construction method reduces body complexity, reduces vehicle assembly time, and reduces the overall vehicle mass while losing none of the structural requirements from a safety, durability, noise, and/or thermal insulation perspective.

In some embodiments, the bus 100 comprises a disability ramp 240. In such embodiments, the disability ramp 240 is incorporated into a floor assembly 220. The disability ramp 240 can be any suitable ramp, including a mechanical or other system (e.g., hydraulics) for deploying the ramp out to a surface of the ground adjacent to the bus 100. In some embodiments, the disability ramp 240 uses hydraulics to lift the ramp and gravity drift for lowering the ramp. In some embodiments, the ramp 240 is configured to extend from the floor assembly 220 to a ground surface where passengers are waiting to onboard or offboard. The disability ramp 240 can have any suitable dimensions and/or load capacity. In some embodiments, the disability ramp 240 is a commercially available unit that is self-contained and configured to drop-in the floor assembly 220. In some embodiments, the disability ramp 240 comprises an electrical interface. In some embodiments, the disability ramp 240 contains no external pump module, no dependence on vehicle hydraulics, no routing of hydraulic hoses, and no pre-assembly. In some embodiments, the disability ramp 240 utilizes a 12V DC battery.

There are several advantages that stem from the combination of features described above for the bus 100. For example, the lowered central section of the frame allows for improved ingress/egress due to the lowered floor and step-in height, and absence of steps, while also housing a centrally located, under floor HV battery pack, which ensures a low center of gravity and therefore good vehicle stability. Further, the bus can use a single battery pack centrally located to ensure better protection in vehicle impact conditions from any direction (e.g., front, side, rear, or roll over). The bus 100 maintains a rear-wheel-drive configuration, which ensures that the gradeability performance (30%) is maintained relative to the original internal combustion engine (ICE) vehicle (cutaway chassis) and the rear powertrain location provides space for the single HV battery pack.

Further, the electric park brake (EPB) is automatically engaged when the bus 100 is in park. The EPB works by utilizing a caliper clamping onto a brake disc that is mounted to the driveshaft. This feature engages and disengages automatically when the driver shifts the gear using the OEM gear shifter. Furthermore, in some embodiments, despite that the electric bus 100 is constructed by converting an ICE to an electric vehicle and removing the front mounted engine, the front impact performance of bus 100 is maintained relative to a baseline vehicle, including the deceleration pulse, structural intrusions into the occupant compartment, and the standard restraints system performance (driver air bag and seat belts). These performance metrics ensure comparable levels of occupant safety relative to the baseline ICE vehicle. In this context, the term "baseline vehicle" refers to refers to a bus having a body-on-frame construction and an internal combustion engine.

Additionally, the cabin body construction method reduces body complexity, reduces vehicle assembly time, and overall vehicle mass while simultaneously satisfying all structural requirements from a safety, durability, noise, and thermal insulation perspective.

Figure 9A:
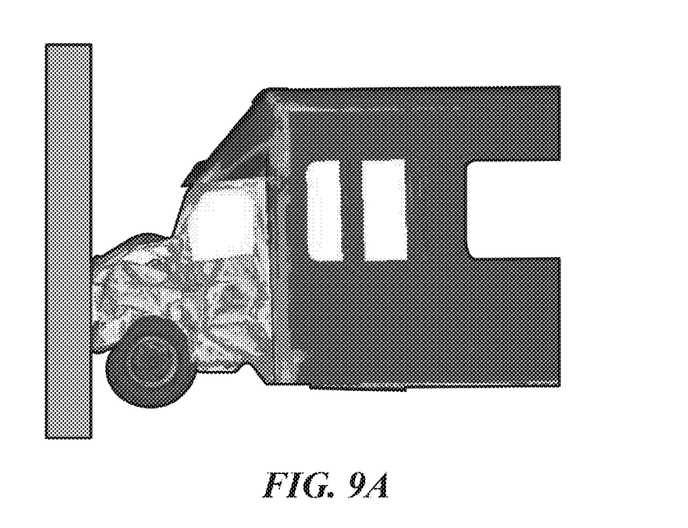
FIG. 9A is an image from a simulated front impact performance analysis for a cutaway chassis without a front end cradle.
Figure 9B:
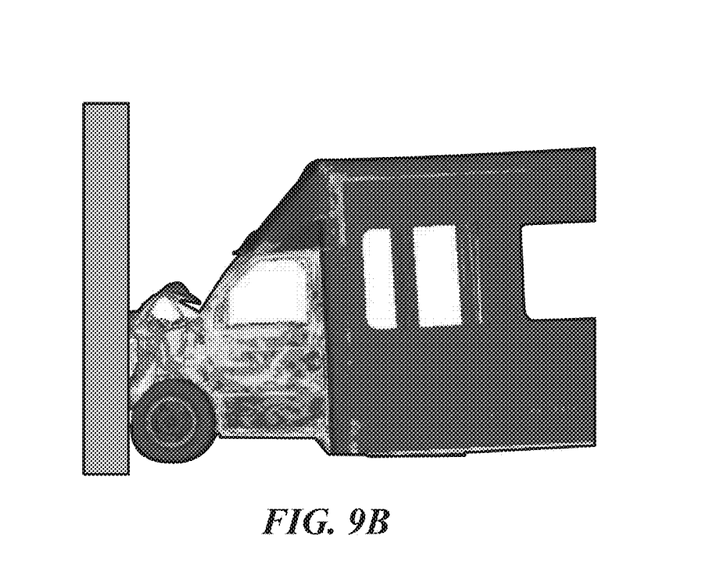
FIG. 9B shows an image from a simulated front impact performance analysis for a cutaway chassis having a front end cradle, according to embodiments described herein.

For example, FIGS. 9A and 9B show the results of simulated front impact performance analysis for a bus constructed from a cutaway chassis without a front end cradle and with the internal combustion engine removed (FIG. 9A) and a bus constructed from a cutaway chassis having an optimized front end high voltage power electronics (HVPE) cradle 114 (FIG. 9B). One skilled in the art would appreciate that, upon a front impact, the bus in FIG. 9A suffers significant front end damage extending from the front end 118 of the frame, the front axle, and the driver cabin. The bus in FIG. 9B, however, suffers significantly less damage that is comparable to the baseline vehicle, as only the front surface of the bus is pushed in and the structure around the driver cabin and door remain substantially intact.

Figure 10A:
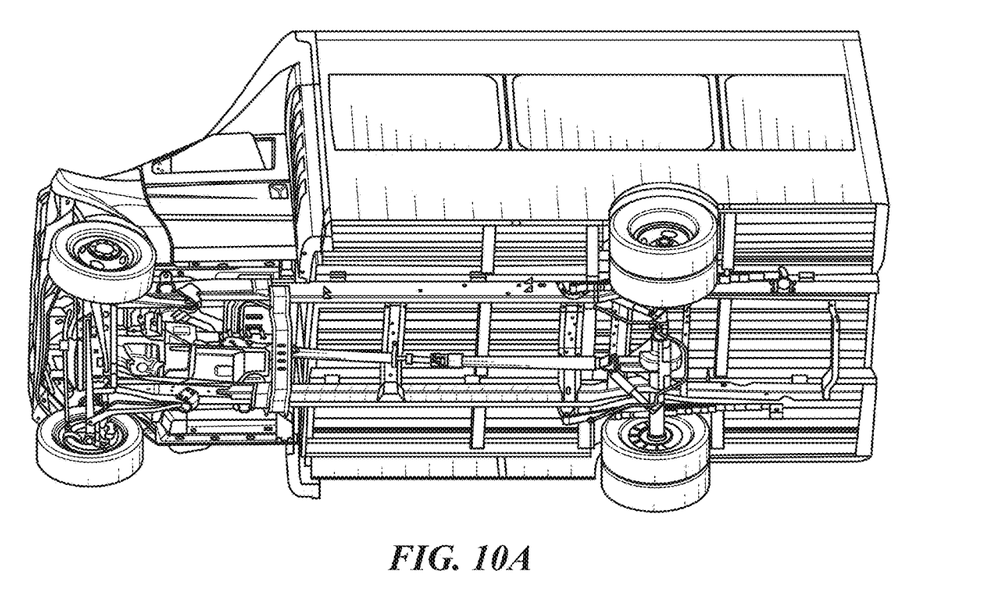
FIG. 10A shows an image from a simulated front impact performance analysis for a vehicle having an internal combustion engine.
Figure 10B:
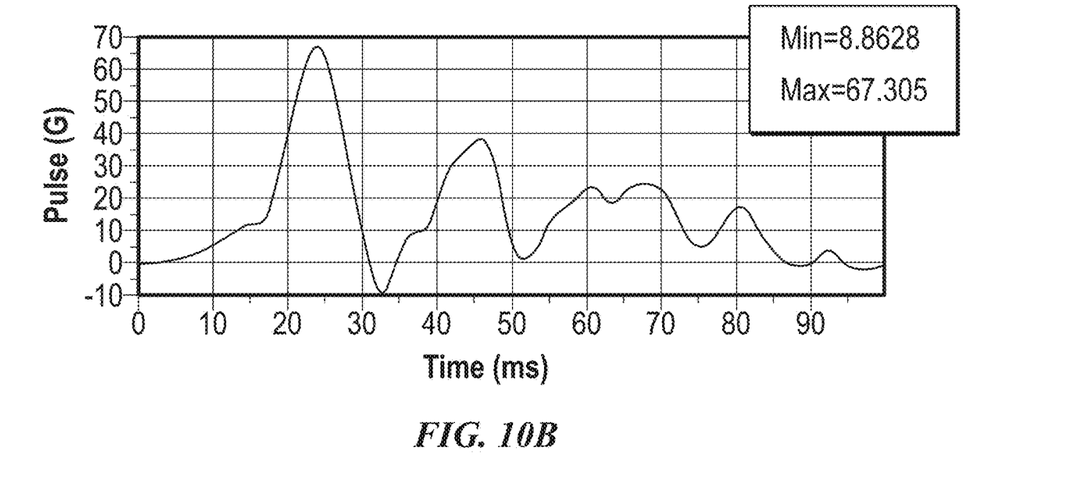
FIG. 10B shows the data obtained from the simulated front impact performance analysis in FIG. 10A.
Figure 11A:
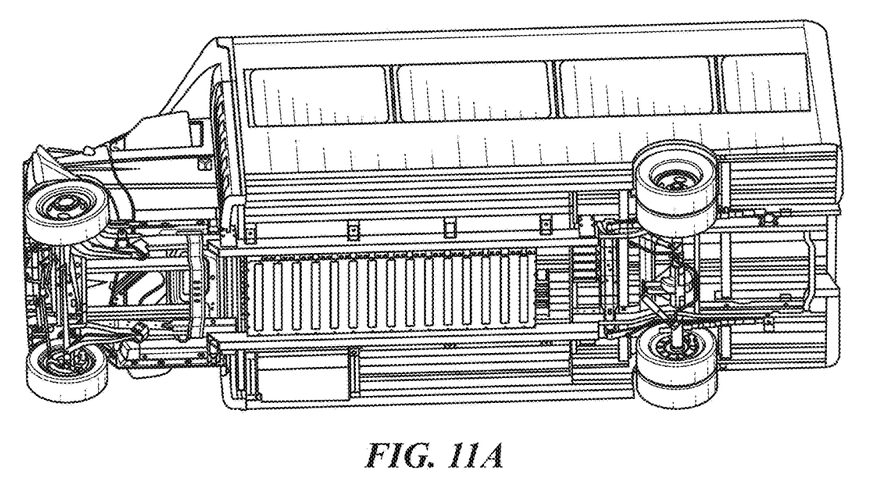
FIG. 11A shows an image from a simulated front impact performance analysis for a vehicle having the electric vehicle system built on a cutaway chassis, according to embodiments described herein.
Figure 11B:
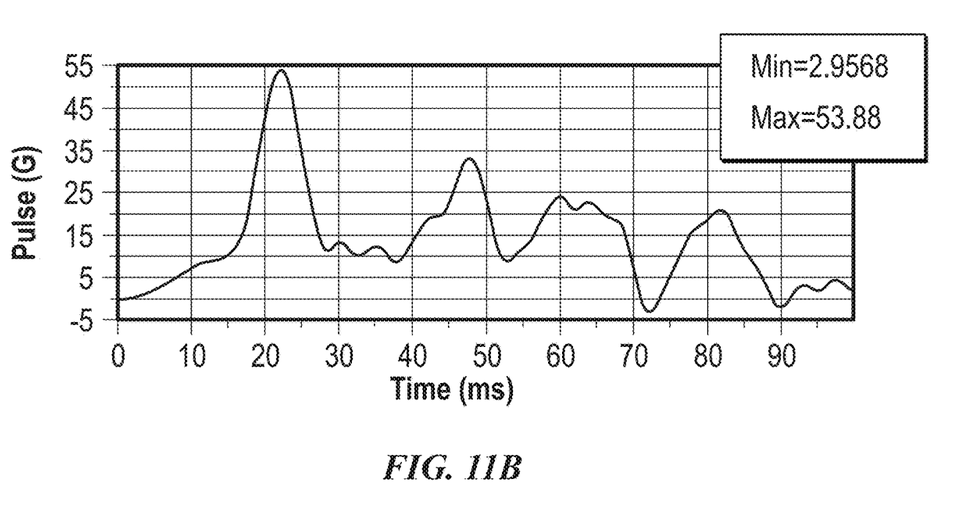
FIG. 11B shows the data obtained from the simulated front impact performance analysis in FIG. 11A.

FIG. 10A shows the results of a simulated front impact performance analysis for a vehicle having an internal combustion engine, and FIG. 10B shows the corresponding data obtained from the simulated front impact performance analysis in FIG. 10A. FIG. 11A shows an image from a simulated front impact performance analysis for a vehicle having the electric vehicle system built on a cutaway chassis, and FIG. 11B shows the corresponding data from the simulated front impact performance analysis in FIG. 11A. The figures show that the electric vehicle constructed from a cutaway chassis exhibits substantially similar data as the vehicle having an internal combustion engine. Accordingly, the front impact performance of bus 100 is maintained relative to the baseline vehicle, including the deceleration pulse, structural intrusions into the occupant compartment, and the standard restraints system performance (DAB and seat belts).

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A low floor electric bus comprising:
   a cutaway chassis comprising a longitudinally extending frame having a front end and a rear end, wherein the frame includes a pair of laterally spaced sidepieces extending from the front end to the rear end, wherein the frame includes a front section, a central section, and a rear section, wherein the central section is positioned at a lower height than the front and rear sections;
   a body coupled to the frame and including a driver cabin and a passenger cabin, wherein the passenger cabin comprises a floor assembly, a sidewall assembly, and a roof assembly;
   a battery pack positioned below the floor assembly, wherein the battery pack is coupled to and extends between the sidepieces in the central section of the frame, wherein the battery pack functions as a load-bearing crossmember for the frame, wherein the frame comprises a skid plate coupled to and extending between the sidepieces immediately in front of the battery pack to thereby protect the battery pack from roadway debris;
   an electric motor coupled to the rear section of the frame;
   a rear axle coupled to the rear section of the frame and comprising a differential driven by the electric motor; and
   a driveshaft extending rearwardly from the differential toward the electric motor.

2. The low floor electric bus of claim 1, wherein the sidepieces in the central section are spaced inwardly from sidewalls of the sidewall assembly.

3. The low floor electric bus of claim 2, wherein the battery pack is positioned entirely between the sidepieces in the central section.

4. The low floor electric bus of claim 1, wherein the electric bus comprises only one battery pack.

5. The low floor electric bus of claim 4, wherein the battery pack has a rectangular box configuration.

6. The low floor electric bus of claim 5, wherein the battery pack is positioned entirely between the sidepieces in the central section.

7. The low floor electric bus of claim 6, wherein the battery pack does not extend above or below the portions of the sidepieces between which the battery pack extends.

8. The low floor electric bus of claim 1, wherein the battery pack occupies a majority of the space between the sidepieces in the central section.

9. The low floor electric bus of claim 1, wherein the sidepieces in the central section are C-channel bars with open sides of the C-channel facing one another.

10. The low floor electric bus of claim 1, wherein the frame comprises a plurality of crossmembers coupled to and extending between the sidepieces, wherein the battery pack and the skid plate function as crossmembers.

11. The low floor electric bus of claim 10, wherein no crossmembers, other than the battery pack and skid plate, are located in the central section.

12. The low floor electric bus of claim 1, wherein each of the sidepieces includes a first sidepiece component forming at least a portion of the front section and a second sidepiece component forming at least a portion of the central and rear sections.

13. The low floor electric bus of claim 12, wherein the first and second sidepiece components are coupled to one another by a frame joint to form a contiguous sidepiece.

14. The low floor electric bus of claim 13, wherein the skid plate is coupled to and extends between the frame joints.

15. A method of constructing the low floor electric bus of claim 1 comprising converting an internal combustion engine (ICE) vehicle into the low floor electric bus.

16. The low floor electric bus of claim 1, wherein the driveshaft comprises a first driveshaft component coupled to the electric motor by a first universal joint and a second driveshaft component extending from the differential and coupled to the first driveshaft component by a second universal joint.

17. The low floor electric bus of claim 1, further comprising a disability ramp coupled to the floor assembly, wherein the central section of the frame comprises an impression configured to provide clearance for the disability ramp, wherein the disability ramp is extendable from the floor assembly to a ground surface when the bus is parked.

18. A low floor electric bus comprising:
- a cutaway chassis comprising a longitudinally extending frame having a front end and a rear end, wherein the frame includes a pair of laterally spaced sidepieces extending from the front end to the rear end, wherein the frame includes a front section, a central section, and a rear section, wherein the central section is positioned at a lower height than the front and rear sections;
- a body coupled to the frame and including a driver cabin and a passenger cabin, wherein the passenger cabin comprises a floor assembly, a sidewall assembly, and a roof assembly;
- a battery pack positioned below the floor assembly, wherein the battery pack is coupled to and extends between the sidepieces in the central section of the frame, wherein the battery pack functions as a load-bearing crossmember for the frame, wherein the frame comprises a skid plate coupled to and extending between the sidepieces immediately in front of the battery pack to thereby protect the battery pack from roadway debris;
- an electric motor coupled to the rear section of the frame; and
- a rear axle coupled to the rear section of the frame and comprising a differential driven by the electric motor,
- wherein the floor assembly comprises one or more longitudinal steel tubes, one or more transverse steel tubes, and one or more floor panels constructed out of a steel sheet; wherein the floor assembly further comprises a composite panel on top of the longitudinal tubes, transverse tubes, and floor panels and a flooring material on top of the composite panel; wherein the sidewall assembly comprises one or more of the sidewall panels, each panel comprising a pair of outer vertical steel tubes covered with a ceramic coating, an interior coating, and an exterior coating; and wherein the roof assembly comprises an interior surface and an exterior surface, one or more steel tubes extending between opposing sidewalls, combined with one or more separate composite panels and interior trim pieces.

* * * * *